Feb. 7, 1950 — C. W. NEWTON — 2,496,811
CHALK HOLDER FOR ATTACHMENT TO MEASURING STICKS
Filed Jan. 28, 1946
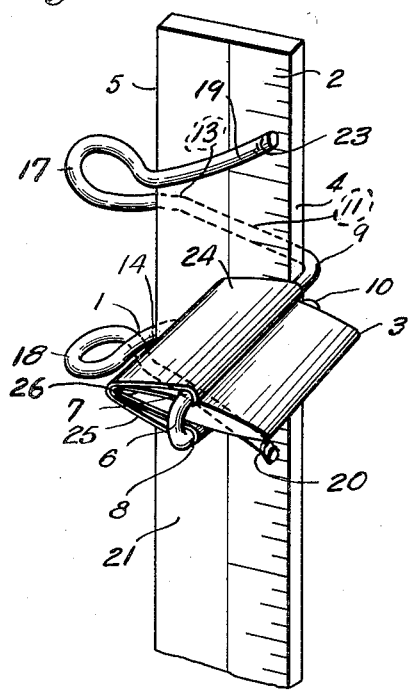
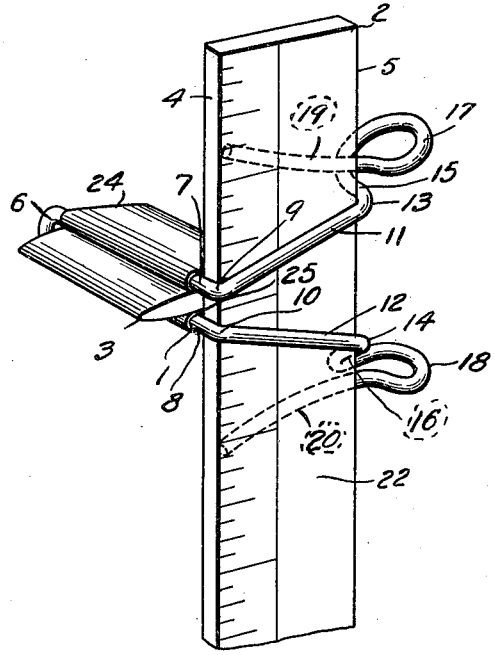
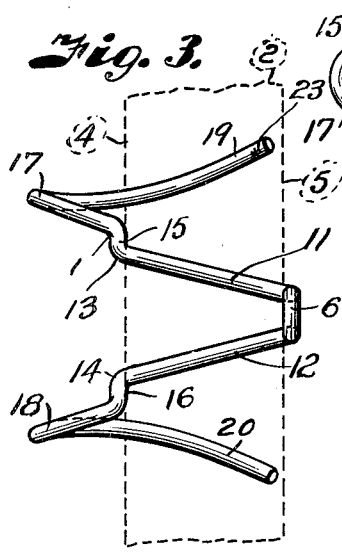
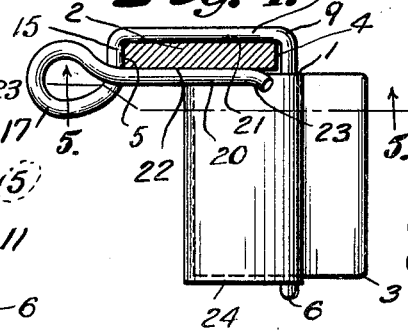
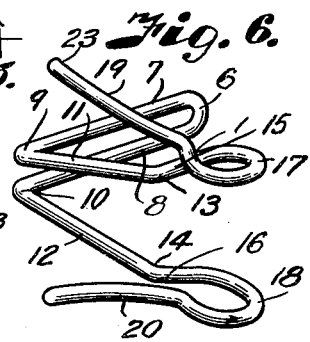
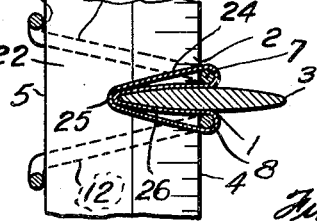
INVENTOR
Charles W. Newton.
BY
Fishburn & Mullendore
ATTORNEYS Patented Feb. 7, 1950

2,496,811

UNITED STATES PATENT OFFICE 2,496,811

CHALK HOLDER FOR ATTACHMENT TO MEASURING STICKS

Charles W. Newton, Kansas City, Mo.

Application January 28, 1946, Serial No. 643,889

4 Claims. (Cl. 24—81)

This invention relates to a combination chalk holder and marker for measuring sticks and has for its principal object to provide a device of this character that is of simple and inexpensive construction and adapted for simultaneously gripping the chalk and stick so as to hold the chalk in flexed selected position.

Other objects of the invention are to provide a holder which enhances grip on the chalk when grip is released on the measuring stick as in adjusting the holder to a new position and to provide a construction which is especially adapted to the formation of the holder from spring wire.

In accomplishing these and other objects of the invention hereinafter pointed out, I have provided improved structure, the preferred form of which is illustrated in the accompanying drawing wherein:

Fig. 1 is a perspective view of my combination holder and marker constructed in accordance with the invention and shown as applied to a measuring stick.

Fig. 2 is a similar view but showing the holder from the opposite side.

Fig. 3 is a side elevational view of the holder, the measuring stick being shown in dotted lines and the chalk pocket being omitted.

Fig. 4 is a cross section through the measuring stick showing the holder in plan.

Fig. 5 is a section on the line 5—5 of Fig. 4.

Fig. 6 is a perspective view of the holder before application of the chalk pocket.

Referring more in detail to the drawing:

1 designates a combination chalk holder and marker for a measuring stick 2 such as used by a tailor in marking height of a skirt or similar garment from the floor. The device 1 is preferably formed of a material such as wire having inherent springiness to effect gripping action on the chalk 3 and the side edges 4 and 5 of the measuring stick as later described.

In forming the device, a wire is cut to length and bent in the center thereof on a substantially semi-circular curve 6 to provide substantially parallel arms 7 and 8 spaced apart a distance less than the thickness of a piece of tailor's chalk 3 so that the chalk may be extended therebetween and gripped on its opposite sides by the arms as best shown in Figs. 1 and 2. The arms are of sufficient length to freely accommodate the width of the chalk and to extend across the edge 4 of the measuring stick. The wire is then bent at substantially right angles as indicated at 9 and 10 to provide laterally extending diverging portions 11 and 12 to overlie a side face of the measuring stick as shown in Fig. 2. The ends of the diverging portions terminate in right angular bends 13 and 14 to form gripping portions 15 and 16 adapted to cooperate with the arms 7 and 8 to grip the edges 4 and 5 of the measuring stick.

Continuing from the gripping portions 15 and 16 are substantially circular loops to provide finger gripping portions 17 and 18 by which the holder may be released so that it can be freely moved along the length of the measuring stick as later described.

The ends of the loops terminate in finger portions 19 and 20 for engaging the face 21 of the measuring stick opposite the face 22 across which the diverging portions 11 and 12 extend. The loops are formed so that a passageway is provided between the diverging portions and the fingers 19 and 20 as best shown in Fig. 4. The holder thus forms a loop through which the measuring stick extends so that the holder may be moved therealong when the finger gripping portions 17 and 18 are moved toward each other to widen the effective space between the gripping portions of the arms 7 and 8 and the gripping portions 15 and 16. In order to avoid gouging of the rule, the terminals of the fingers are preferably rounded outwardly as indicated at 23 in Fig. 4.

While the chalk may be supported between the arms, I prefer to provide a chalk pocket 24 formed of flexible material such as a fabric tape formed in an endless belt 25 for insertion over the arms after which one side 26 of the band is pressed retractively between the arms to form the pocket 24 substantially conforming to the width of the chalk and of less depth than the chalk so that the chalk is supported in projecting relation with respect to the arms of the holder. The pocket protects the chalk and also provides means whereby the chalk may be gripped without soiling the hands when the device is used; for example, in marking the height of a skirt from the floor.

In applying the holder, the finger gripping portions 17 and 18 are pressed toward each other to move the diverging portions 11 and 12 of the clamp 1 toward each other and provide sufficient space between the arms 7 and 8 and the gripping portions 15 and 16 to permit passageway of the clamp over an end of the measuring stick 2. Upon release of the gripping pressure the diverging arms 11 and 12 spring apart so that the gripping portions 15 and 16 move into gripping contact with the adjacent edge 5 of the measuring stick and support the clamp in fixed position thereon. The chalk 3 is inserted in the slot-like opening formed between the arms 7 and 8 so that one edge thereof seats in the bottom of the pocket 24 while the other edge projects from the arms.

In using the device, the finger gripping portions 17 and 18 are pressed together to free the holder on the measuring stick, after which the holder may be moved therealong until the chalk is in registry with the desired measurement from the end of the stick. The chalk may be gripped by placing the thumb and finger over the pocket 24 and resting the end of the measuring stick on the floor. The chalk may be struck about a dress to mark the height thereof from the floor while it is being fitted to the wearer.

It is obvious that when the holder is released so that it may be moved along the length of the measuring stick the pressure required in releasing the diverging portion enhances grip on the chalk so that the chalk is not likely to become disarranged when the adjustment is being made.

From the foregoing it is obvious that I have provided a combination chalk holder and marker of inexpensive and simple construction and which firmly grips the chalk and measuring stick on which it is adapted to be used.

What I claim and desire to secure by Letters Patent is:

1. A chalk holder for attachment to a measuring stick including a wire having a reverse bend intermediate its ends to provide substantially parallel arm portions for gripping opposite sides of a piece of chalk and adapted to cross one edge of the measuring stick to support said chalk in lateral projection from a side face of the measuring stick and having substantially right angle bends to provide diverging arm portions for engaging the opposite side face of the measuring stick and which terminate in lateral bends to provide edge engaging portions to cooperate with said crossing portions of the chalk holding arms in exerting a binding pressure on the edges of the stick incidental to spring action in said wire, said edge engaging portions having reverse bends to provide finger engaging loops and arm portions for engaging the opposite side face of the stick to cooperate with the diverging arm portions in guiding the holder on the measuring stick while retaining the chalk in substantially fixed angular relationship with the stick, said loop portions being adapted to be moved toward each other to release binding pressure on the edges of the measuring stick, and to supplement gripping action of the chalk holding arm portions on the chalk when held therebetween when shifting the holder on said stick.

2. A chalk holder for attachment to a measuring stick including a wire having a reverse bend intermediate its ends to provide substantially parallel arm portions for gripping opposite sides of a piece of chalk and adapted to cross one edge of the measuring stick to support said chalk in lateral projection from a side face of the measuring stick and having substantially right angle bends to provide diverging arm portions for engaging the opposite side face of the measuring stick and which terminate in lateral bends to provide edge engaging portions to cooperate with said crossing portions of the chalk holding arms in exerting a binding pressure on the edges of the stick incidental to spring action in said wire, said edge engaging portions having reverse bends to provide finger engaging loops and arm portions for engaging the opposite side face of the stick to cooperate with the diverging arm portions in guiding the holder on the measuring stick while retaining the chalk in substantially fixed angular relationship with the stick, said loop portions being adapted to be moved toward each other to release binding pressure on the edges of the measuring stick and to supplement gripping action of the chalk holding arm portions on the chalk when held therebetween when shifting the holder on said stick, and a chalk pocket on said chalk holding arms.

3. A chalk holder for attachment to a measuring stick including a wire having a reverse bend intermediate its ends to provide substantially parallel arm portions for gripping opposite sides of a piece of chalk and adapted to cross one edge of the measuring stick to support said chalk in lateral projection from a side face of the measuring stick and having substantially right angle bends to provide diverging arm portions for engaging the opposite side face of the measuring stick and which terminate in lateral bends to provide edge engaging portions to cooperate with said crossing portions of the chalk holding arms in exerting a binding pressure on the edges of the stick incidental to spring action in said wire, said edge engaging portions having reverse bends to provide finger engaging loops and arm portions crossing over said edge engaging portions in diverging relation relatively to the diverging arm portions which are connected by said loop portions for engaging the opposite side face of the stick to cooperate with the diverging arm portions in guiding the holder on the measuring stick while retaining the chalk in substantially fixed angular relationship with the stick, said loop portions being adapted to be moved toward each other to release binding pressure on the edges of the measuring stick, and to supplement gripping action of the chalk holding arm portions on the chalk when held therebetween and when shifting the holder on said stick.

4. A chalk holder for attachment to a measuring stick including a wire having a reverse bend intermediate its ends to provide substantially parallel arm portions for gripping opposite sides of a piece of chalk and adapted to cross one edge of the measuring stick to support said chalk in lateral projection from a side face of the measuring stick and having substantially right angle bends to provide diverging arm portions for engaging the opposite side face of the measuring stick and which terminate in lateral bends to provide edge engaging portions to cooperate with said crossing portions of the chalk holding arms in exerting a binding pressure on the edges of the stick incidental to spring action in said wire, said edge engaging portions having reverse bends to provide finger engaging loops and arm portions crossing over said edge engaging portions in diverging relation relatively to the diverging arm portions which are connected by said loop portions for engaging the opposite side face of the stick to cooperate with the diverging arm portions in guiding the holder on the measuring stick while retaining the chalk in substantially fixed angular relationship with the stick, said loop portions being adapted to be moved toward each other to release binding pressure on the edges of the measuring stick and to supplement gripping action of the chalk holding arm portions on the chalk when held therebetween and when shifting the holder on said stick, and a chalk pocket on said chalk holding means.

CHARLES W. NEWTON.

REFERENCES CITED

The following references are of record in the file of this patent:

UNITED STATES PATENTS

| Number | Name | Date |
|---|---|---|
| 881,484 | Peck | Mar. 10, 1908 |
| 1,111,212 | Cardell | Sept. 22, 1914 |
| 1,163,505 | Cardell | Dec. 7, 1915 |